UNITED STATES PATENT OFFICE.

ROBERT HOCHSTETTER, OF CINCINNATI, OHIO.

PIGMENT.

1,052,145. Specification of Letters Patent. Patented Feb. 4, 1913.

No Drawing. Application filed July 9, 1910. Serial No. 571,201.

*To all whom it may concern:*

Be it known that I, ROBERT HOCHSTETTER, a citizen of the United States, and a resident of Mount Auburn, Cincinnati, in the county of Hamilton and State of Ohio, have invented certain new and useful Improvements in Pigments; and I do hereby declare that the following is a full, clear, and exact description thereof.

This invention relates to a novel and improved pigment and to a process for producing the same and consists of the matters hereinafter described and more particularly pointed out in the appended claims.

In carrying out my process to produce my improved pigment I proceed as follows: I couple the diazotized paranitroorthotoluidin

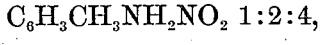
$C_6H_3CH_3NH_2NO_2$ 1:2:4, with the sodium salt of betaoxynaphthoic acid

$C_{10}H_6CH COOH$ 2:3, in a distinctly acid solution. This produces the acid salt of paranitrotoluene-orthoazo-betaoxynaphthoic acid which is practically insoluble in water and is the new pigment, that is to say, the pigment, directly.

As a specific example of the production of my improved pigment, I dissolve 15.2 parts of paranitroorthotoluidin in 27 parts of muriatic acid of 20 degrees Bé. by aid of heat, and then cool the solution to 32° F. by means of ice. Add 7.5 parts sodium nitrite ($NaNO_2$) and stir until completely diazotized. To this diazotized solution add 7 parts of sodium acetate and 10 parts of acetic acid 56%. Dissolve 18.8 parts of betaoxynaphthoic acid in 5 parts of caustic soda, 80%, NaOH, by aid of heat. Then cool to 70 degrees F. To this solution add the diazotized solution described above, stirring constantly. This produces the pigment.

The pigment is of a beautiful red color with a strong bluish tone. It is soluble in concentrated sulfuric acid with brilliant bluish-red color and is precipitated in the form of bluish-red flakes from this solution by adding water.

In case a color of less tinctorial strength is desired, the pigment may be produced on an inert base such as blanc fixe, barytes, china clay, or similar substance. In this case the inert base is first made into a smooth paste with water, and then added to the solution of the sodium salt or betaoxynaphthoic acid before adding the solution of diazotized paranitroorthotoluidin.

I claim as my invention—

1. As a new article of manufacture the acid salt of paranitrotoluene-orthoazo-betaoxy-naphthoic acid the same being red in color with a strong bluish tone and in the dry form being insoluble in water, but soluble in alcohol; dissolving in sulfuric acid with a bluish red tone, the addition of water producing a precipitation in the form of flakes; and being incapable of reduction with zinc and hydrochloric acid or with stannous chlorid and hydrochloric acid.

2. The process of coupling diazotized paranitroorthotoluidin with an alkaline salt of betaoxynaphthoic acid in a distinctly acid solution.

3. As a new article of manufacture, the acid salt of paranitrotoluene-orthoazo-betaoxy-naphthoic acid, the same being practically insoluble in water, red in color with a strong bluish tone; and being soluble in concentrated sulfuric acid with brilliant bluish red color, bluish red flakes being precipitated from the solution upon the addition of water.

In testimony, that I, claim the foregoing as my invention I affix my signature in the presence of two witnesses, this seventh day of July A. D. 1910.

ROBERT HOCHSTETTER.

Witnesses:
JAMES HAMILTON,
J. B. HAWLEY.